Patented Apr. 9, 1940

2,196,843

UNITED STATES PATENT OFFICE 2,196,843

PROCESS OF RECOVERING CARBON DISULPHIDE IN THE MANUFACTURE OF ARTIFICIAL SILK

Hendrikus van Deinse, Nijmegen, Netherlands, assignor to Naamlooze Vennootschap Kunstzijdespinnerij Nyma, Nijmegen, Netherlands No Drawing. Application February 3, 1939, Serial No. 254,422. In the Netherlands January 19, 1938

2 Claims. (Cl. 23—206)

My invention relates to the manufacture of artificial silk and more especially silk produced according to the viscose process, in which the pretreated cellulose fibers are mixed with carbon disulphide and the xanthogenate precipitated from the mixture.

It is an object of my invention to recover as great a quantity of carbon disulphide as possible in order to reduce the loss of this substance.

Hitherto a great percentage of the carbon disulphide is lost at various points of the manufacturing process and since carbon disulphide commands a relatively high price, it is important that the losses be limited to a minimum. Different suggestions have already been made to this end, most of which were based on a special treatment of the silk for the purpose of expelling the carbon disulphide and subsequently condensing it.

As a rule the viscose silk is treated in a closed vessel with hot water or steam in such manner that the vapors of carbon disulphide developed above the water level can be condensed by cooling. This mode of recovery involves the drawback that the carbon disulphide in contact with hot water will give rise to a development of gas. The carbon disulphide escapes at the surface of the spooled silk or silk cake, whereby the spooled body of silk is somewhat loosened. In consequence thereof during washing and further treatment of the silk the filaments are likely to be displaced relative to each other, which may subsequently give rise to difficulties, for instance during twisting of the filaments.

According to the present invention the spooled silk is washed by sucking a warm washing liquid through the body of silk by generating a partial vacuum by means of a liquid-ring pump, i. e. a wing pump containing an annular body of liquid formed under the action of the centrifugal force and alternatingly entering channels formed in the pump casing and in the wings. From the mixture of liquid and vapor sucked through the silk I prefer separating the liquid phase which is then removed by means of a separate pump, while the gas phase passes through the vacuum space under the action of the liquid-ring pump mentioned above. In contact with the liquid (water) operating this pump by far the greatest part (about 90%) of the quantity of carbon disulphide to be recovered is condensed. The water is then led together with the condensed carbon disulphide through a settling tank fitted with an overflow. On the bottom of this tank the carbon disulphide settles down and can be tapped.

If desired a small condenser can be inserted behind the liquid-ring pump whereby also a great part of the last traces of carbon disulphide is recovered.

By thus expelling the carbon disulphide by means of warm water and passing the mixture of air and vapor sucked through, which contains a comparatively high percentage of carbon disulphide, through a liquid-ring pump I succeed in recovering the greater part of the carbon disulphide during the sucking off. I can dispense with absorption devices or larger condensing apparatus, since most of the carbon disulphide is already condensed in the liquid-ring pump.

In this manner a considerable part of the carbon disulphide used in the process can be recovered as shown by the following examples.

Example 1

35 kgs. carbon disulphide were used in the manufacture of 100 kgs. artificial silk, about 16 kgs. remaining in the freshly spun and spooled silk. When washing the spools with the aid of a liquid-ring pump after having washed it in the vat with water of about 70° C., about 11 kgs. carbon disulphide were condensed, so that about 30% of the carbon disulphide entered into the process were recovered. The recovered carbon disulphide can be reused as a rule after removal of the acid without any further purification.

Example 2

Into the vat, in which the silk is placed, water of about 40° C. is introduced and the liquid is gradually replaced by water of about 70° C. In this manner 13–14 kgs. carbon disulphide were recovered.

I am aware that in the specification of U. S. Patent 2,042,016 a process for the recovery of carbon disulphide during the washing step is described, according to which the spooled silk is also exposed to suction and the carbon disulphide, evaporated during the washing step, is condensed by adsorption on activated carbon or solution in oil. Mention is made in that specification of cooling to effect condensation, whenever the concentration of carbon disulphide in the mixture of air and vapor sucked through the silk is sufficiently high, but in the main the carbon disulphide is recovered either by adsorption or by dissolving it in a solvent. This prior method involves great drawbacks, for, if the silk shall be washed with a warm washing liquid, a dry vacuum pump must be used, since in a liquid-ring pump the greater part of the carbon disulphide would be condensed and would never reach the adsorption apparatus. If on the other hand the silk is washed with a cold liquid, it takes a very long time until all of the carbon disulphide is expelled from the silk. The first cost of the adsorption and dissolving devices is very high and in view of the high inflammability of carbon disulphide there exists a great danger of explosion during evaporation from the oil or the activated carbon, so that special measures must be taken to avoid this. Similarly the use of a dry vacuum pump is unsatisfactory for the purpose here in view.

Various changes may be made in the details disclosed in the foregoing specification without departing from the invention or sacrificing the advantages thereof.

I claim:

1. In the process of recovering carbon disulphide from spun viscose silk, which comprises sucking a washing liquid through the spun silk, separating the liquid and the carbon disulphide vapor and removing them separately, the steps of using a warm washing liquid, generating a vacuum by means of a liquid-ring pump for sucking the carbon disulphide vapor separated from said washing liquid, condensing the main part of this carbon disulphide vapor in contact with the liquid rotating in said liquid-ring pump and separating the condensed carbon disulphide from the pumping liquid.

2. The process of claim 1, in which the carbon disulphide vapor, which has not been condensed by the pumping liquid, is further cooled down by suitable cooling means for the recovery of further quantities of carbon disulphide.

HENDRIKUS van DEINSE.